US009672561B1

(12) United States Patent
Angilivelil (10) Patent No.: US 9,672,561 B1
(45) Date of Patent: Jun. 6, 2017

(54) FAIL-SAFE ORDERING (71) Applicant: Amazon Technologies, Inc., Reno, NV (US)

(72) Inventor: Aby Thomas Angilivelil, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 511 days.

(21) Appl. No.: 14/188,188

(22) Filed: Feb. 24, 2014

Related U.S. Application Data (63) Continuation of application No. 13/071,474, filed on Mar. 24, 2011, now Pat. No. 8,688,545.

(51) Int. Cl.
*G06Q 30/06* (2012.01)

(52) U.S. Cl.
CPC ..... *G06Q 30/0635* (2013.01); *G06Q 30/0633* (2013.01); *G06Q 30/0637* (2013.01); *G06Q 30/0601* (2013.01)

(58) Field of Classification Search
CPC ........... G06Q 30/0601; G06Q 30/0633; G06Q 30/0635; G06Q 30/0637; H04L 29/0809; H04L 29/0872
USPC ......... 705/26.1, 26.8, 26.81, 26.82; 709/217, 709/218, 219
See application file for complete search history.

(56) References Cited

U.S. PATENT DOCUMENTS

| 6,029,141 | A | 2/2000 | Bezos et al. |
| 6,453,360 | B1 | 9/2002 | Muller et al. |
| 7,739,551 | B2 | 6/2010 | Eickmeyer et al. |
| 7,801,752 | B2 | 9/2010 | Neulight |
| 8,156,012 | B1 | 4/2012 | Eisner et al. |
| 8,688,545 | B1* | 4/2014 | Angilivelil ............ G06Q 30/06 705/26.8 |
| 2002/0023127 | A1 | 2/2002 | Sabeti |
| 2002/0156704 | A1* | 10/2002 | Kolls ................. G06Q 30/0601 705/26.1 |
| 2003/0041022 | A1* | 2/2003 | Battle ................ G06Q 20/0425 705/39 |
| 2003/0120592 | A1* | 6/2003 | Ng ......................... G06Q 20/04 705/39 |
| 2007/0250354 | A1 | 10/2007 | Neulight |

(Continued)

OTHER PUBLICATIONS

Fuller, "Verify this! Credit card authorization: online or off," Gale/Cengage, Databased Web Advisor, vol. 15, No. 7, 1997, 4 pages.

(Continued)

*Primary Examiner* — Nicholas D Rosen
(74) *Attorney, Agent, or Firm* — Lee & Hayes, PLLC (57) ABSTRACT

An action submitted via a network may be fulfilled despite the network, or a website accessible via the network, experiencing an error that prevents processing of the action when the action is received. In one example, the user that submitted the action may receive a confirmation page indicating that the action has been received. Transaction data may be retrieved based at least in part on the action and/or the user that submitted the action. Once the transaction data is stored in a queue, the transaction data may be processed either automatically or manually. Subsequently, the action may be fulfilled without the user needing to resubmit the action. Alternatively, the action may be optimistically fulfilled prior to the action being processed.

20 Claims, 5 Drawing Sheets

(56) References Cited

U.S. PATENT DOCUMENTS

| | | |
|---|---|---|
| 2008/0103949 A1 | 5/2008 | Lobana et al. |
| 2008/0133419 A1* | 6/2008 | Wormington ........... G06Q 20/12 705/64 |
| 2008/0140552 A1 | 6/2008 | Blaikie |
| 2008/0320343 A1 | 12/2008 | Eickmeyer et al. |
| 2009/0164607 A1 | 6/2009 | Clark et al. |
| 2009/0222823 A1 | 9/2009 | Parkinson et al. |
| 2009/0222897 A1 | 9/2009 | Carow et al. |
| 2010/0082420 A1* | 4/2010 | Trifiletti ................. G06Q 20/20 705/14.27 |
| 2010/0199132 A1* | 8/2010 | Compton ............ G06F 11/0709 714/57 |
| 2010/0217780 A1 | 8/2010 | Erola et al. |
| 2010/0223165 A1* | 9/2010 | Calman .................. G06Q 40/12 705/30 |
| 2010/0332304 A1 | 12/2010 | Higgins et al. |
| 2011/0047098 A1 | 2/2011 | Erlanger |
| 2011/0066509 A1 | 3/2011 | Pizano et al. |
| 2011/0082771 A1 | 4/2011 | Pritikin et al. |
| 2012/0173655 A1 | 7/2012 | McEntee |

OTHER PUBLICATIONS

Office action for U.S. Appl. No. 13/071,474, mailed on Mar. 12, 2013, Angilivelil, "Fail-Safe Ordering," 15 pages.
Office action for U.S. Appl. No. 13/071,474, mailed on Jul. 23, 2013, Angilivelil, "Fail-Safe Ordering," 18 pages.

* cited by examiner

| ORDER 302 | CUSTOMER ID 304 | ITEM ID 306 | DEVICE ID 308 | PAYMENT INSTRUMENT(S) 310 |
|---|---|---|---|---|
| (1) | A8UN56 | THE GREAT GATSBY | E-BOOK READER1 | VISA 2691 |
| (2) | M3RC29 | HOTEL CALIFORNIA | MP3PLAYER | GIFT CARD 22945 |
| ... | ... | ... | ... | ... |
| (N) | P8HQ72 | HD TELEVISION | 000000 | CREDIT ON ACCOUNT |

FAIL-SAFE QUEUE 300

FAIL-SAFE ORDERING

This application is a continuation of and claims priority to U.S. patent application Ser. No. 13/071,474, filed on Mar. 24, 2011, issued as U.S. Pat. No. 8,688,545 on Apr. 1, 2014, titled "Fail-Safe Ordering," of which Aby T. Angilivelil is the inventor, the disclosure of which is incorporated by reference herein.

BACKGROUND

Consumers are increasingly using the Internet to perform a variety of actions, such as making purchases and acquiring information corresponding to a particular topic. More particularly, the Internet may be utilized by a consumer to purchase tangible products (e.g., books, televisions, etc.), digital content (e.g., electronic books ("e-Books"), MP3 music files, etc.), and/or services (collectively referred to herein as "items"). Often, when a customer attempts to purchase a particular item, he or she may not be able to complete the order due to an error experienced by a network or a website (e.g., a dropped order). As a result, the error may prevent the customer from being able to purchase the item or the customer may be required to attempt to purchase the same item again, which may lead to an unsatisfactory customer experience. If the customer experiences a significant amount of dropped orders, the customer may be inclined to purchase the item elsewhere, such as from a website associated with a different company or from a physical retail store. Therefore, it would be beneficial to both the customer and the entity that provides an item to reduce and/or eliminate dropped orders associated with transactions made via a network.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

This disclosure describes decreasing an amount of, or eliminating, a number of orders that are dropped when conducting an action or transaction over a network, such as acquiring an item over a network and from a website. As a result, the systems and techniques described herein may allow an order for a particular item to be fulfilled, regardless of whether the network used to order the item experiences some type of error before the order is finalized. To illustrate, a customer may access a website associated with a company in order to search for and acquire (e.g., purchase, rent, lease, borrow, download, etc.) items, such as digital media content (e-Books, MP3 files, etc.). However, when the customer attempts to finalize the transaction and, therefore, order the item, an error experienced by the website may cause the order to fail. In some cases, the website may display an error page (e.g., a "we are sorry" page) explaining that the order could not be completed (or, in other words, was "dropped").

In the above example, since the order has been dropped, the customer will not receive the items the customer intended to acquire. As a result, if the customer still desires to order the item, the customer will be forced to resubmit the order, order the item from a different website, or acquire the item from a physical retail location. Provided that the customer would like to resubmit the order, the website may require the customer to navigate back to the previous webpage in the web browser and re-enter the information that is necessary to complete the order. In any case, the dropped order (sometimes referred to as a "fatal") may cause the customer to be become frustrated and, therefore, lead to an unsatisfactory customer experience. Furthermore, if the customer decides to purchase the item elsewhere, the dropped order may also result in a lost sale for the seller of the item.

Therefore, reducing the number of, or eliminating, dropped orders will likely lead to a more positive user experience. In various embodiments, as described herein in further detail, various types of transaction data associated with a customer and/or the item being ordered may be identified and retrieved. For instance, this transaction data may include a customer identifier, an item identifier, a device identifier, and/or a payment instrument to be used by the customer. Once the above information is known, the systems described herein may detect any instance where a website may display an error page (e.g., a "we are sorry" page) and store the transaction data in a queue for future processing. Therefore, even if the customer believes he/she is unable to complete the order at that time, the order may nonetheless be processed and fulfilled either at that time or at a time in the future. An order may be fulfilled when an item is provided to the customer, when the customer receives the confirmation page, when the order is processed via the network, etc. For instance, for a physical item, the order may be deemed fulfilled when the item is shipped and/or delivered to the user. For a digital item (e.g., e-Books, MP3 music files, etc.), the order may be fulfilled when the digital content is either downloaded to a user device or is otherwise downloadable by the user. However, the order may also be deemed fulfilled due to some other event.

In some embodiments, after the transaction data associated with a particular order is stored in the queue, the order may be optimistically fulfilled. That is, the order may be fulfilled, thus resulting in the customer receiving the ordered item, without first processing the order and charging the customer. Optimistic fulfillment may be appropriate when the customer is trusted and/or when the order satisfies a certain confidence threshold. Moreover, the customer may be presented with a confirmation page (e.g., a "thank you" page), indicating that the order has been received. In this example, although the customer has yet to receive a confirmation that the ordered item is being processed and/or delivered, the confirmation page may notify the customer that they will receive a confirmation communication once the order has been processed. In either of the above embodiments, the transaction data included in the queue may be processed either automatically or manually to complete the order. Accordingly, provided that the transaction data is retrieved by the system, the system can ensure that each order is received and subsequently processed, regardless of whether the network or website experiences an error when the order is received. As a result, each order received via a website may be fulfilled with little, if any, risk of the orders being dropped.

The discussion begins with a section, entitled "Example Environment," describing a system for processing and fulfilling an order received via a website. Next, the discussion includes a section, entitled "Reduction in Dropped Actions," that describes a system for reducing the number of dropped orders with respect to a network, such as a website. The discussion then moves on to an "Example Fail-Safe Queue" section that illustrates an example queue used for storing transaction data associated with one or more orders. The discussion then includes a section, entitled "Example Methods," that illustrates and describes example processes for implementing the described techniques. Lastly, the discussion includes a brief "Conclusion".

This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Example Environment

Figure 1:
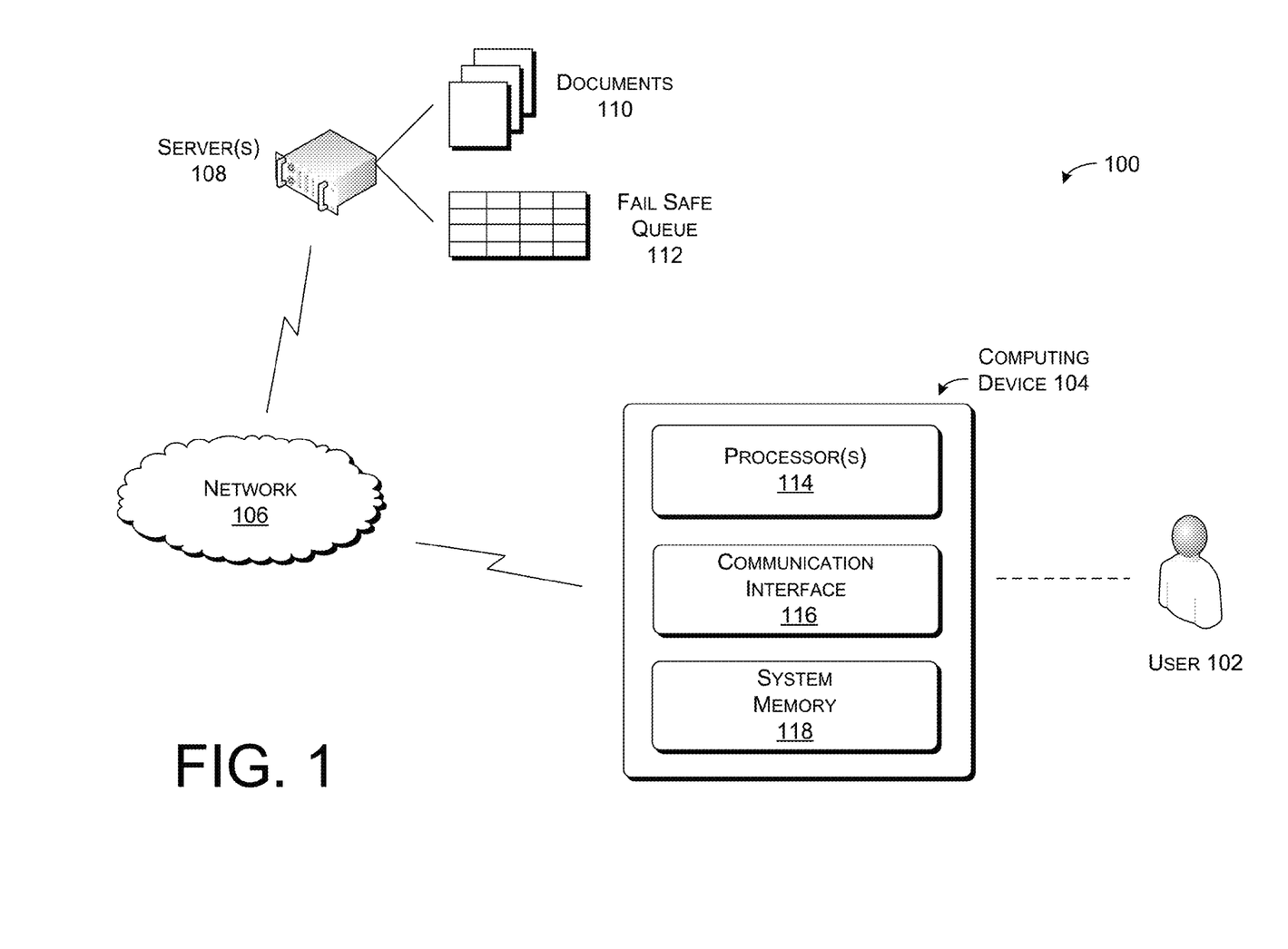
FIG. 1 is a diagram showing an example system including a user, a computing device, a network, and one or more servers. In this system, the number of dropped orders associated with a transaction made via a network may be decreased or eliminated.

FIG. 1 illustrates an example system 100 for reducing the number of orders made over a network (e.g., via a website) that are subsequently dropped. More particularly, the system 100 includes a user 102, a computing device 104, a network 106, one or more server(s) 108, documents 110 associated with the server(s) 108, and a fail-safe queue 112 associated with the server(s) 108. In various embodiments, the computing device 104 includes one or more processor(s) 114, a communication interface 116, and system memory 118. The computing device 104 may include any number of components that may perform various actions associated with reducing the number of dropped orders.

In various embodiments, the user 102 may be an individual and may use the computing device 104 to access the network 106. For instance, the user 102 may access and navigate between one or more web pages or web documents (e.g., documents 110) that may be of interest to the user 102. Further, the user 102 may access the web pages for the purpose of acquiring (e.g., purchasing) goods and/or services, such as tangible products (e.g., books, a television, etc.) and/or digital content (e.g., e-Books, MP3 music files, etc.).

In some embodiments, the network 106 may be any type of network known in the art, such as the Internet. Moreover, the computing device 104 may communicatively couple to the network 106 in any manner, such as by a wired or wireless connection. Further, the server(s) 108 may be any type of server known in the art, such as a web server. The server(s) 108 may store one or more of the documents 110, which may include documents accessible via the network 106. In various embodiments, the documents 110 may include web pages, video files, audio files, images, and/or any other type of content known in the art.

Moreover, the servers 108 may store the fail-safe queue 112, which may include information relating to various actions performed via the network 106 and/or orders for items. For instance, for each order included in the fail-safe queue 112, this information may include a customer identifier, a device identifier, an item identifier, and/or identification of a payment instrument. Moreover, a subset of the above information, or any other additional information, may also be included in the fail-safe queue 112. As shown in FIG. 1, the computing device 104 may access the server(s) 108, the corresponding documents 110, and the fail-safe queue 112 by way of the network 106.

The server(s) 108 may also include multiple layers. For example, a first layer of a particular server 108 may execute a piece of code that may cause the functionality associated with the system 100 to be executed. Moreover, a second layer of the above server 108 may communicate with an ordering service such that orders from the user 102 by way of the computing device 104 are received and/or processed. In parallel, the fail safe queue 112 may receive the orders and place these orders into the fail safe queue 112.

The techniques and mechanisms described herein may be implemented by multiple instances of the computing device 104 as well as by any other computing device, system, and/or environment. The computing device 104 shown in FIG. 1 is only one example of a computing device and is not intended to suggest any limitation as to the scope of use or functionality of any computing device utilized to perform the processes and/or procedures described above.

In at least one configuration, the processor(s) 114 may execute one or more modules and/or processes to cause the computing device 104 to perform a variety of functions. In some embodiments, the processor(s) 114 may include a central processing unit (CPU), a graphics processing unit (GPU), both CPU and GPU, or other processing units or components known in the art. Additionally, each of the processor(s) 114 may possess its own local memory, which also may store program modules, program data, and/or one or more operating systems.

In various embodiments, the communication interface 116 may allow the computing device 104 to communicate and/or interface with the network 106 and/or one or more devices, such as the server(s) 108.

Depending on the exact configuration and type of the computing device 104, the system memory 118 may include volatile memory (such as RAM), non-volatile memory (such as ROM, flash memory, miniature hard drive, memory card, or the like) or some combination thereof. The system memory 118 may include an operating system, one or more program modules, and/or program data.

As mentioned previously, the system memory 118 may include any components that may be used to reduce the number of dropped orders associated with the network 106, such as a website, for example. Although these components are described as being included within the system memory 118, these components may additionally or alternatively be stored on a different or remote device or devices, such as the server(s) 108. The foregoing components are described in detail with respect to FIGS. 2-5.

The computing device 104 may have additional features and/or functionality. For example, the computing device 104 may also include additional data storage devices (removable and/or non-removable) such as, for example, magnetic disks, optical disks, or tape. Computer-readable media may include, at least, two types of computer-readable media, namely computer storage media and communication media. Computer storage media may include volatile and non-volatile, removable, and non-removable media implemented in any method or technology for storage of information, such as computer-readable instructions, data structures, program modules, or other data. The system memory 118, the removable storage and the non-removable storage are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other non-transmission medium that can be used to store the desired information and which can be accessed by the computing device 104. Any such computer storage media may be part of the computing device 104. Moreover, the computer-readable media may include computer-executable instructions that, when executed by the processor(s) 114, perform various functions and/or operations described herein.

In contrast, communication media may embody computer-readable instructions, data structures, program modules, or other data in a modulated data signal, such as a carrier wave, or other transmission mechanism. As defined herein, computer storage media does not include communication media.

The computing device 104 may also have input device(s) such as a keyboard, a mouse, a pen, a voice input device, a touch input device, etc. Output device(s), such as a display, speakers, a printer, etc. may also be included. The user 102 may utilize the foregoing features to interact with the computing device 104, the network 106, and/or the server(s) 108. For instance, the user 102 may use the computing device 104 to order items and/or services via the network 106. In addition, and by way of the computing device 104, the user 102 may also receive communications relating to a particular order. For instance, while navigating a website, the user 102 may receive a confirmation that an order has been received but will be fulfilled at a later time or that an order has been processed.

The illustrated computing device 104 is only one example of a suitable device and is not intended to suggest any limitation as to the scope of use or functionality of the various embodiments described. Other computing devices, systems, environments and/or configurations that may be suitable for use with the embodiments include, but are not limited to, personal computers, server computers, such as servers 108, hand-held or laptop devices (e.g., e-Book reader devices), multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

Reduction in Dropped Actions

Figure 2:
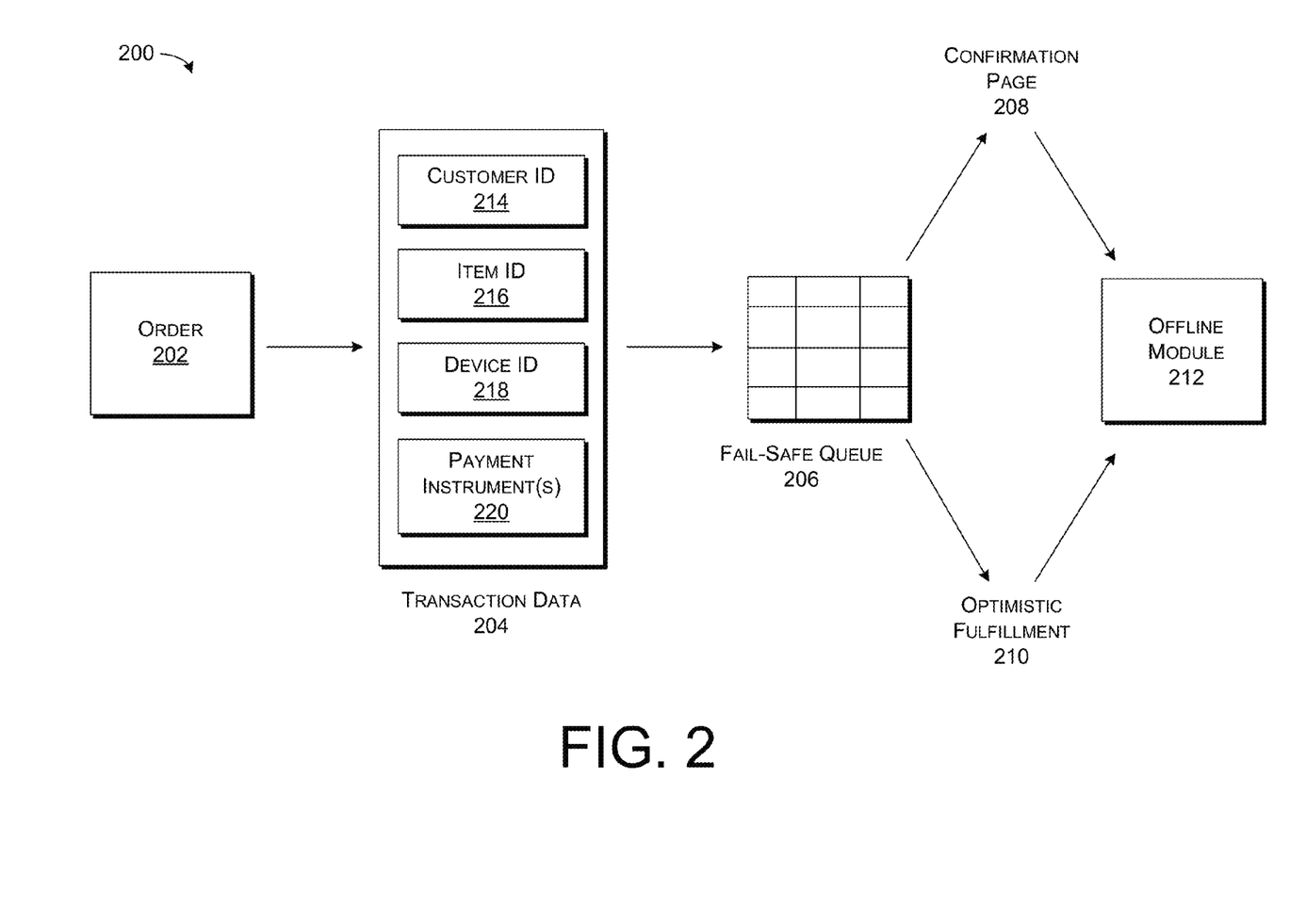
FIG. 2 is a diagram showing an example process of fulfilling a particular order associated with an item.

FIG. 2 illustrates a diagram representing a system 200 for reducing the number of dropped actions in an online system or network. More particularly, the system 200 includes an order 202, transaction data 204, a fail-safe queue 206, a confirmation page 208, optimistic fulfillment 210, and an offline module 212. Furthermore, the transaction data 204 may include a customer identifier (ID) 214, an item ID 216, a device ID 218, and/or a payment instrument(s) 220.

In various embodiments, a user, such as user 102, may navigate a network (e.g., a website) using a computing device (e.g., computing device 104) and may submit any type of action or identify an item and/or service that the user would like to acquire. In various embodiments, the user may be attempting to acquire any type of item, such as a physical item and/or digital content. For instance, provided that the user owns, or has access to, a device capable of rendering an electronic book (e.g., an electronic book (e-Book) reader device, a smart phone with an e-Book application, etc.), the user may desire to purchase digital content (e.g., an e-Book) for such a device. Once the user is able to identify digital content of interest to the user, the user may attempt to order the item by, for example, actuating an "acquire" (e.g., purchase) button. As a result, the order 202 may be submitted to the system 200.

In various embodiments, the action (e.g., order) may relate to a transaction made via a network. For instance, the action may be submitted to a website, which is possibly associated with the Internet. Moreover, the action may be submitted in any other manner, such as by ordering the item via an application on a computing device (e.g., e-Book reader device, a mobile telephone, any other portable electronic devices, etc.). The action may also be submitted via a text message from a telephone (e.g., a mobile telephone, etc.) or via instant messaging. Therefore, the action may comprise an order for an item and may be submitted using any means that enables the user to submit the action.

However, as stated above, if the network in which the action is being made experiences an error, the network may be unable to receive and/or process the order 202. In various embodiments, the network error may include any type of error, such as, for example, an error associated with network software or an error caused by a virus or malware. As a result of the error, the user may receive an error page (e.g., a "we are sorry" page) informing the user that the system 200 was unable to receive and/or process the order 202 at that time. Provided that the user is presented such a page, the user would then need to resubmit the order 202 if the user still desires to purchase that particular item. That is, the user would likely need to return to the site in which the order was submitted and possibly re-enter information in order to submit the order 202 for a second time. Requiring the user to resubmit the order 202 may result in confusion about whether the order was completed, and consequently a poor user experience. The user may become sufficiently frustrated so that the user decides to purchase the item elsewhere, thus resulting in a lost sale for the entity that is selling, renting, or otherwise providing the item.

In various embodiments, to avoid presenting the error page (e.g., a "we are sorry" page) to the user and to provide a greater user experience, the system 200 may retrieve the transaction data 204 in response to the user submitting the order 202. That is, the system 202 may utilize any information associated with the order 202 so that it is able to both accept and fulfill the customer order 202. For instance, the system 200 may detect any instance where the system 200 could present an error page and identify the transaction data 204 associated with that order 202. Therefore, even assuming that a software error in the system 200 caused the order 202 to fail, the system 200 could still process the order 202 by utilizing the transaction data 204.

As mentioned previously, for each order 202, the transaction data 204 may include a customer ID 214, an item ID 216, a device ID 218, and/or payment instrument(s) 220. However, the transaction data 204 could include all, any combination, or none of the foregoing information. Moreover, the transaction data 204 may include any other type of information associated with the order 202, such as information in addition to the customer ID 214, the item ID 216, the device ID 218, and the payment instrument(s) 220. In various embodiments, the customer ID 214 may constitute any set of characters and/or numbers that identifies a particular user (e.g., customer). For instance, the customer ID 214 may be the user's login name for the website or a unique identifier assigned to that user by the system 200. Regardless of how the customer ID 214 is generated, the system 200 is able to identify any customer by their respective customer ID 214.

In some embodiments, for a particular order 202, the system 200 may retrieve the customer ID 214 for a registered user if that user has logged on to the network (e.g., website, other site, etc.) in which the order 202 has been placed. If the user has yet to log on, the system 200 may require the user to provide their respective username and/or password prior to submitting the order 202. Once the user has logged on, the system may retrieve the user's associated customer ID 214. Alternatively, for users that are not registered with the network (e.g., new customers), the system 200 may ask the new user to register with the network prior to submitting the order 202, thus providing the new customer with a customer ID 214. Again, once the user is logged in to the network, the system 200 may retrieve the customer ID 214 for that user. In various embodiments, if the order 202 is submitted via a website, the system 200 may retrieve the customer ID 214 by the user registering or logging in to the website.

In addition, the item ID 216 may serve to identify the item included in the order 202. That is, the item ID 216 may correspond to the item that the user is attempting to purchase, rent, or otherwise acquire via the network. In various embodiments, the item ID 216 may be the actual name of the item, a model number for that item, or a unique identifier that otherwise distinguishes that particular item from different items. For instance, the item ID 216 for a television may be the name of the television assigned by its manufacturer or an associated model number. Moreover, the item ID 216 for an e-Book may be the title of the book or some other unique identifier that differentiates that e-Book from other e-Books. Once the user submits the order 202 for a particular item, the system 200 may identify the item ID 216 associated with that item.

In some embodiments, the device ID 218 may correspond to a unique identifier that identifies a device currently owned by and/or registered by the user/customer. For example, in the context of digital content, the user may be attempting to purchase an e-Book or an MP3 media file. Therefore, the device ID 218 may identify an e-Book reader device a device with which the user may listen to MP3 files (e.g., a computing device, a smart phone, etc.), respectively. That is, the device ID 218 may identify the device with which the user is attempting to purchase and/or download digital content. In various embodiments, in order for the user to download content to its own device, the user may need to provide the device ID 218 to, and/or register the device with, the system 200. Alternatively, the system 200 may identify the device ID 218 for a particular device when the user couples the device to their respective computing device prior to downloading the digital content included in the order 202.

In other embodiments, multiple device IDs 218 may correspond to a particular order 202 such that content could be selectively distributed to one or more devices respectively associated with the multiple device IDs 218. For instance, assume that the order 202 includes digital content to be downloaded to one or more devices (e.g., an e-Book reader device, a laptop computer, a smart phone, etc.) registered to a user. As a result, the device ID 218 may correspond to each of these devices or each of these devices may contain a unique device ID 218 associated therewith. In the above embodiment, when the digital content is downloadable to the user, the digital content may be downloaded to a particular one, or any combination, of the devices. Therefore, either the system 200 or the user may specify which devices are to receive the digital content included in the order 202. That is, the order 202 may be fulfilled with respect to multiple devices associated with the user.

Furthermore, the payment instrument(s) 220 may identify one or more methods of payment that the user may utilize to purchase or otherwise acquire the item included in the order 202. For instance, prior to completing the order 202, the user may need to identify how the item will be acquired. That is, the user may specify that the item included in the order 202 may be purchased using a credit card, a gift card, and/or credit associated with the user's account. However, the payment instrument(s) 220 may include any method of payment that is accepted by the entity from which the item is being acquired. The type of payment instrument 220 to be used by the user may be requested by the system 200 so that the system 200 can confirm that the user has adequate resources to acquire that particular item. Moreover, the user may identify multiple payment instrument(s) 220 that the user could potentially utilize to acquire the item associated with the order 202.

In some embodiments, the system 200 may identify the transaction data 204 for each order 202 submitted to the system 200 or only for those orders 202 in which an error page may be displayed to the user. In other words, the system 200 may retrieve the transaction data 204 for a particular order 202 when the network experiences an error and, therefore, is unable to either receive or process the order 202. In the above embodiments, the transaction data 204 associated with a particular order 202 may be stored in the fail-safe queue 206, which may be stored on one or more servers (e.g., servers 108). The fail-safe queue 206 may be in the form of a table that includes the information (e.g., transaction data 204) associated with the order 202. The fail-safe queue 206 and an example structure thereof will be discussed in additional detail with respect to FIG. 3.

As stated above, when the system 200 is unable to receive and/or process the order 202, information associated with the order 202 (e.g., the transaction data 204) may be stored in the fail-safe queue 206 so that the order 202 may be processed at a later time. That is, in the case of a software glitch and/or some other type of error, the fail-safe queue 206 may include a sufficient amount of information to enable the system 200 to still process the order 202 without requiring the user to perform any additional actions. In the foregoing example, the user would not be required to resubmit the order 202 to ensure that the order 202 would be subsequently fulfilled. As a result, once the user indicates a desire to complete the order 202 (e.g., by actuating a "purchase" button), the user would be confident that the order 202 would be received and fulfilled. In this embodiment, the system 200 may avoid frustration associated with re-entering information and completing the order 202 for a second time.

In the event that the system 200 experiences an error and is, therefore, unable to process and/or fulfill the order 202 at the time the order 202 is received, the system 200 may display to the user the confirmation page 208 (e.g., a "thank you" page). The confirmation page 208 may inform the user that the order 202 has been received and that the order 202 will be fulfilled at a later time. Moreover, the confirmation page 208 may also indicate that the system 200 (e.g., website) has experienced an error but also may assure the user that the order 202 will be processed in a timely manner. In addition, the confirmation page 208 may confirm that the system 200 will send the user a confirmation, by way of email or by any other communication means (e.g., telephone call, text message, regular mail, etc.), when the order 202 is processed and/or fulfilled. In various embodiments, the confirmation page 208 may be displayed to the user so that the user is aware that the order 202 was received and that the user will receive the item at a later time.

Subsequently, or in the alternate, the system 200 may perform optimistic fulfillment 210 of the order 202. In optimistic fulfillment 210, the system 200 may fulfill the order 202 and provide the user with the ordered item without first processing the order 202. That is, the system 200 may optimistically fulfill 210 the order 202 when the order 202 is submitted by the user and receive the funds associated with the purchase at a later time. For instance, assume that the order 202 relates to an e-Book that is to be downloaded to a device registered to the user. Further assume that upon the user submitting the order 202, an error occurs that prevents the system 200 from being able to process and complete the order 202. In some circumstances, the user would not be able to receive the download until the order 202 was subsequently processed. However, via optimistic fulfillment 210, the system 200 may provide the ordered content (e.g., the e-Book) to the user and process the order 202 at a later time. As a result, the user will be able to download the e-Book shortly after submitting the order 202. Moreover, due to the error, the system 200 may not receive funds commensurate with the order 202 until the order 202 can be processed. In many cases, despite the system 200 error, optimistic fulfillment 210 may provide the user with a better customer experience since the user may immediately receive the ordered content.

In various embodiments, optimistic fulfillment 210 may be performed by the system 200 provided that some assurance or confidence threshold is satisfied. For instance, the system 200 may optimistically fulfill 210 the order 202 if the system 200 trusts that the user will subsequently provide payment for the item that the user previously received. In various embodiments, this trust may be based on the number of prior purchases made by that user, the total value of purchases made by the user, the type of item being ordered, the value of the particular item being ordered, or any other factor that may show that the user is more likely to provide payment in exchange for the item. Users who have previously made multiple purchases and/or have spent a significant amount of money on a particular website may be trusted to a greater degree than a user who has never acquired an item from that site (e.g., website, network, application, etc.). In response to a user's loyalty to a site (possibly represented by multiple purchases from the site), the system 200 may reward that user by optimistically fulfilling 210 the order 202 prior to processing the order 202 and/or receiving payment from the user. Moreover, since this user has shown a pattern of continued interest in the site, and because an entity associated with the site may be confident that the user will provide payment in exchange for the item, the entity may want to provide the user with an even greater customer experience.

However, if the system 200 is unsure whether the user will provide payment for the item at a later date, the threshold described above may not be satisfied. That is, before optimistically fulfilling 210 the order 202 for this particular user, the system 200 may first determine whether the threshold is satisfied. In other words, the system 200 may determine whether there is a pattern of trusted behavior exhibited by the user. If the confidence threshold is not satisfied, the system 200 may refrain from optimistically fulfilling 210 the user's order 202. Instead, the system 200 may present the confirmation page 208 to the user, as described above.

In various embodiments, regardless of whether the system 200 displays a confirmation page 208 or whether the system 200 performs optimistic fulfillment 210 with respect to the order 202, the order 202 may be subsequently processed by the offline module 212. The offline module 212 may be any type of software that automatically processes each order 202 stored in the fail-safe queue 206. Further, the offline module 212 may be considered a re-drive mechanism since the order 202 that was previously submitted is now being processed. More particularly, the offline module 212 may use the transaction data 204 for each order 202 included in the fail-safe queue 206 to process these orders 202. In some embodiments, the customer ID 214, the item ID 216, the device ID 218, and/or the payment instrument(s) 220 for a particular order 202 may constitute a sufficient amount of information to process the order 202 and charge the user for the item included in the order 202. Once the offline module 212 processes a particular order 202 and receives payment for the item, the system 200 may provide the item to the user. For example, the system 200 may allow the user to download digital content or may arrange for a physical item to be shipped to the user.

In other embodiments, if the offline module 212 is unable to process the orders 202 stored in the fail-safe queue 206, these orders 202 may be manually processed. That is, individuals may place the orders 202 by manually entering the orders 202 into the system 200. Therefore, even if the system 200 is not functioning properly, the orders 202 included in the fail-safe queue 206 may nonetheless be processed and the ordered items may be provided to their respective customers. Since the processing of the orders 202 is conducted on the backend, the system 200 does not require any additional actions and/or input from the user after the user has indicated that they would like to acquire a particular item. Therefore, once it is determined that the system 200 is experiencing an error and/or that the user may be presented with an error page (e.g., a "we are sorry" page), the order(s) 202 may be processed on the backend regardless of whether the user is provided with a confirmation page 208 or if the order 202 is optimistically fulfilled 210.

Typically, when a user submits an order 202 utilizing a network, the orders 202 are binary, meaning that they either completely succeed or fail. However, the systems and techniques described herein allow a particular order 202 to be fulfilled provided that certain transaction data 204 associated with that order 202 are identified. Once the transaction data 204 are received, the transaction data 204 may be stored in a fail-safe queue 206 so that the order 202 may be processed at a later time. In various embodiments, once the user submits the order 202, the system 200 may provide a confirmation page 208 that informs the user that the order 202 has been received and that it will be subsequently processed. Although the order 202 will not be immediately fulfilled, the user may be notified when the order 202 is in fact fulfilled.

In different embodiments, the system 200 may determine whether the order 202 should be optimistically fulfilled 210, which may result in the order 202 being fulfilled and the user receiving the item immediately. The order 202 may be optimistically fulfilled 210 when a certain threshold is satisfied and/or when the user has proven to be a good customer over time. Regardless of whether the order 202 is optimistically fulfilled 210, the transaction data 204 stored in the fail-safe queue 206 may be used by the offline module 212 to process each order 202 that has yet to be processed. The order 202 may then be processed on the backend so that the user is not required to perform any additional actions to fulfill the order 202, in addition to initially submitting the order 202. Accordingly, instead of receiving an error page (e.g., a "we are sorry" page) indicating that the user's order 202 cannot be processed, the systems and techniques described herein allow the order 202 to be fulfilled, thereby resulting in more positive customer experience for the user.

In addition, systems and techniques described above may be applicable in contexts in addition to the purchase of an item. For example, the systems and techniques described above may be utilized for any type of user action associated with a site (e.g., a website, an application, etc.). For instance, the systems and techniques described herein may apply when a customer is attempting to sign up or register for a particular website, a service, an email distribution list, etc. While the user is finalizing the registration, the network or website may experience an error, thus causing the user to receive an error page. Since the user may be a future customer, an entity associated with the site may want to ensure that the user is in fact registered. As a result, information (e.g., transaction data 204) collected from the user may be stored in a queue (e.g., fail-safe queue 206) and then processed so that the user is nevertheless registered. In some embodiments, the user may receive a confirmation page (e.g., confirmation page 208) informing the user that they are registered with the website, service, etc. Therefore, the registration may be completed without requiring the user to perform any additional actions. Furthermore, if the user provided an email address or a telephone number, the user may be contacted in an effort to complete the registration.

Moreover, the systems and techniques described above may also be utilized in the customer service context. For instance, assume that, during the process of filing an online complaint directed at an entity and/or an employee thereof, the network or website experiences an error. As a result, if the user had not finalized and submitted the complaint, the user may be forced to resubmit the complaint. However, assuming further that the user had entered some type of contact information, such as an email address and/or a telephone number, the user may receive a confirmation page (e.g., confirmation page 208) confirming that the user will be contacted by the entity in which the complaint is being filed. Subsequently, the entity may contact the user to receive and discuss the complaint in detail. As a result, the user would not be required to spend additional time resubmitting the complaint.

The foregoing systems and techniques are not limited to the embodiments described above and may be utilized in any other context known in the art.

Example Fail-Safe Queue

Figure 3:
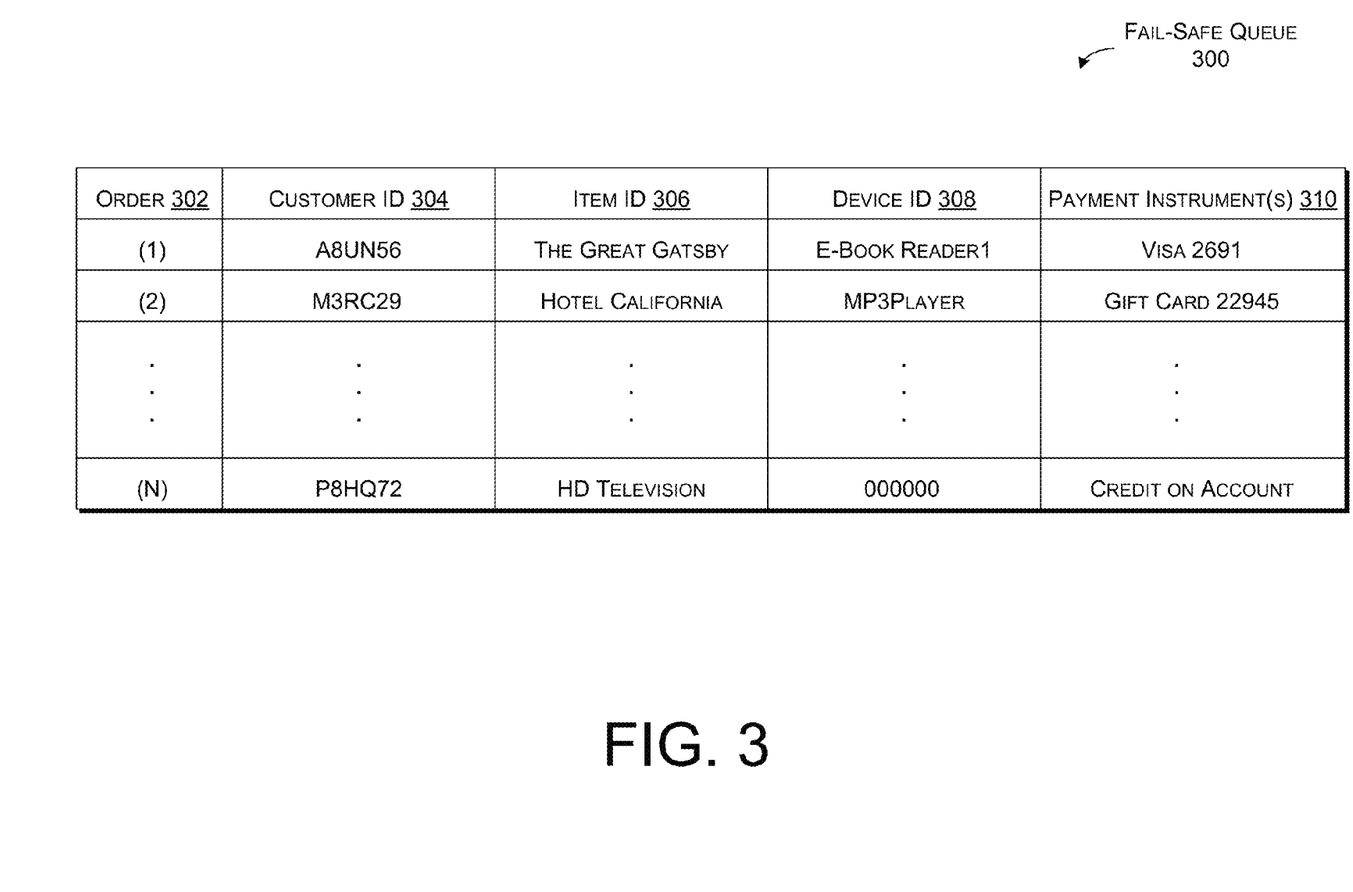
FIG. 3 is a diagram showing an example fail-safe queue that is used to collect and process one or more orders.

FIG. 3 illustrates an example fail-safe queue 300 that is utilized to process one or more orders received from a user. More particularly, the fail-safe queue 300 may or may not correspond to fail-safe queue 206 and may be stored in and/or is accessible by one or more servers, such as servers 108. Furthermore, the fail-safe queue 300 may include vertical columns corresponding to an order 302, a customer ID 304, an item ID 306, a device ID 308, and payment instrument(s) 310 (e.g., transaction data 204), which, in various embodiments, may correspond to order 202, customer ID 214, item ID 216, device ID 218, and payment instrument(s) 220, respectively. Additionally, each horizontal row of the fail-safe queue 300 may correspond to a different order 302 received from a customer. However, the fail-safe queue 300 may be structured and/or organized in other configurations.

In various embodiments, upon receiving an item order 302 from a user, an error experienced by a network may cause the order to not be received and/or processed. As a result, the user may receive an error page (e.g., a "we are sorry" page) and would be required to navigate back to the previous page in order to resubmit the order 302, resulting in an undesirable customer experience. However, despite the network experiencing this error, by storing various types of information (e.g., transaction data 204) relating to the order 302 in the fail-safe queue 300, the order 302 may nonetheless be processed at a later time without requiring the user to take any additional action. That is, after the user indicates an intent to acquire a particular item, the user should feel confident that the order 302 will be fulfilled.

As stated above, FIG. 3 illustrates that the fail-safe queue 300 stores transaction data corresponding to each of a first order (1), a second order (2), and an order received subsequent to the first order and the second order (N). For instance, order (1) has a customer ID 304 of "A8UN56," an item ID 306 of "The Great Gatsby," a device ID 308 of "e-Book Reader1," and a payment instrument 310 of "Visa 2691." That is, the customer associated with the customer ID 304 "A8UN56" has ordered the e-Book, "The Great Gatsby," to be downloaded to their e-Book Reader1, and has submitted payment using a Visa credit card ending in the numbers "2691." Likewise, order (2) has a customer ID 304 of "M3RC29," an item ID 306 of "Hotel California," a device ID 308 of "MP3Player," and a payment instrument 310 of "Gift Card 22945," meaning that the customer associated with the customer ID 304 "M3RC29" has ordered the MP3 music file, "Hotel California," to be downloaded to their MP3 player, and has submitted payment using a gift card. Lastly, order (N) has a customer ID 304 of "P8HQ72," an item ID 306 of "HD Television," a device ID 308 of "000000," and a payment instrument 310 of "Credit on Account." That is, the customer associated with the customer ID 304 "P8HQ72" has ordered an HD television using credit stored on their account. Moreover, as shown in FIG. 3, since the HD television need not be downloaded to a particular device, the HD television may not have an associated device ID 308 (represented by "000000"). Alternately, the device ID 308 for order (N) may include any identifier that represents an address in which the HD television is being shipped and/or delivered.

The fail-safe queue 300 may include a subset of the foregoing categories or categories in addition to order 302, customer ID 304, item ID 306, the device ID 308, and payment instrument(s) 310. In addition, the fail-safe queue 300 may include any number of orders 302 that have yet to be processed and may be arranged in any manner.

Moreover, in various embodiments, the information stored in the fail-safe queue 300 is sufficient to process each of the orders 302 included therein. For instance, the offline module 212 illustrated in FIG. 2, may process each of the orders 302 on the backend so that each order 302 is subsequently processed. In other embodiments, the system associated with the fail-safe queue 300 may be unable to fulfill a particular order 302 if the customer ID 304, item ID 306, device ID 308, and the payment instrument(s) 310 are not first retrieved. In these embodiments, if the system is unable to collect this information, the user may have to resubmit the order 302.

In some embodiments, the offline module 212 may be a software module that processes these orders 302 automatically. In other embodiments, the orders 302 stored in the fail-safe queue 300 may be processed by manually entering the transaction data 204 associated with each order 302. Once this transaction data 204 is entered, the order 302 associated with that transaction data may be processed.

Consequently, (1) the user's order 302 may be fulfilled and payment may be authorized (if the user has only received a confirmation page 208) or (2) the user's payment instrument(s) 310 maybe charged (if the order 302 has been optimistically fulfilled 210).

Example Methods

Figure 4:
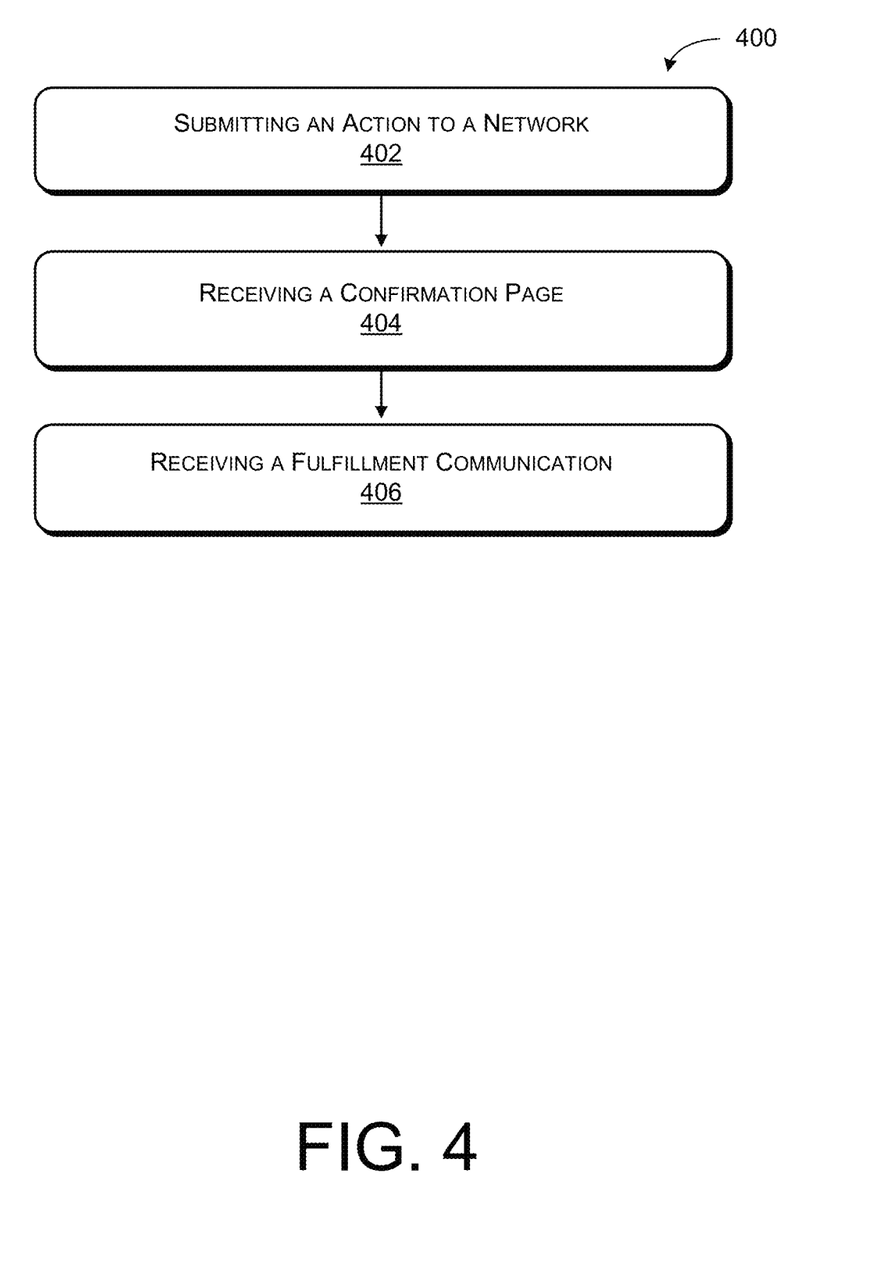
FIG. 4 is a flow diagram showing an example process of submitting an action over a network and receiving a confirmation page relating thereto.
Figure 5:
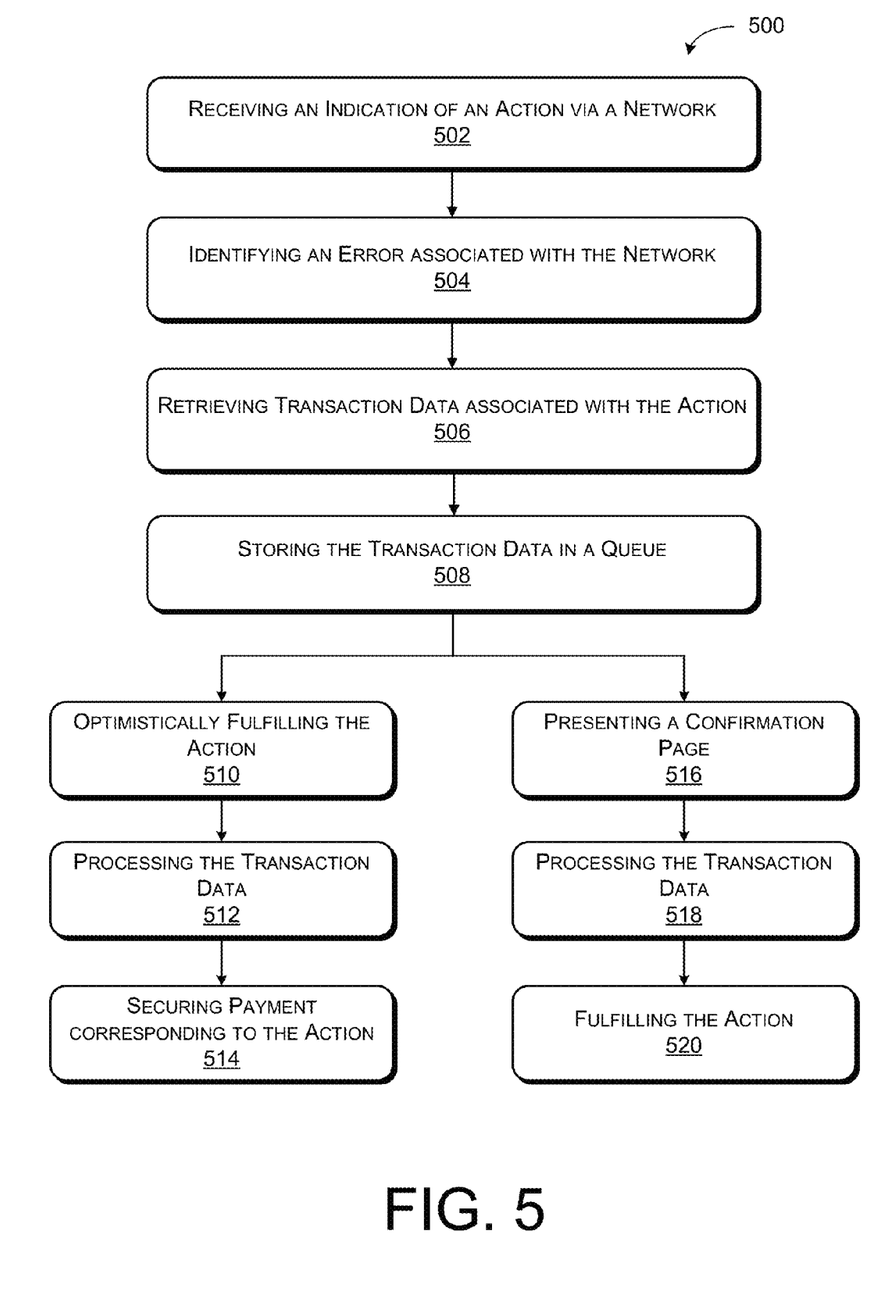
FIG. 5 is a flow diagram showing an example process of fulfilling an action received via a network.

FIGS. 4 and 5 describe various example methods of fulfilling an action received via a network. The example methods are described in the context of the environment of FIGS. 1-3, but are not limited to those environments. The order in which the operations are described in each example method is not intended to be construed as a limitation, and any number of the described blocks can be combined in any order and/or in parallel to implement each method. Moreover, the blocks in FIGS. 4 and 5 may be operations that can be implemented in hardware, software, or a combination thereof. In the context of software, the blocks represent computer-executable instructions stored in one or more computer-readable storage media that, when executed by one or more processors, cause one or more processors to perform the recited operations. Generally, the computer-executable instructions may include routines, programs, objects, components, data structures, and the like that cause the particular functions to be performed or particular abstract data types to be implemented.

FIG. 4 is a flow diagram illustrating an example method of submitting an action via a network and subsequently receiving confirmation that the action has been fulfilled. Moreover, the following actions described with respect to FIG. 4 may be performed by a computing device (e.g., computing device 104) operated by a user (e.g., user 102). In particular, block 402 illustrates submitting an action to a network. In various embodiments, the action may be any type of indication suggesting that a user, such as user 102, would like to perform an action associated with the network. For instance, the action may include any type of user actuation (e.g., via a mouse, a keystroke, a touch-sensitive user interface, etc.) indicating that the user desires to acquire (e.g., purchase, rent, etc.) an item (e.g., a physical item, digital content, etc.) via the network. That is, the user actuation may identify an item to be acquired by the user, which may be subsequently referred to as an "order." Alternatively, the user actuation may correspond to the user attempting to register for a website or signing up for a particular service, for example.

Block 404 illustrates receiving a confirmation page. In various embodiments, the confirmation page may or may not correspond to confirmation page 208, as illustrated in FIG. 2. Moreover, the confirmation page may be presented and/or displayed to a user upon the user submitting the action. In the context of the user purchasing an item from a site via the network, the confirmation page may confirm that the order has been received by the site. Further, the confirmation page may inform the user that the user will be notified when the action/order is fulfilled. In other words, the confirmation page may confirm that the user will be notified when the requested item is shipped and/or downloaded to the user.

In other embodiments, the user may receive the confirmation page when an error associated with the network prevents the site from fulfilling the action/order at that particular time. Therefore, the confirmation page may confirm to the user that the action/order has been received and that the action/order will be processed, fulfilled, and/or completed at a later time. As a result, the user will know that it need not resubmit the order. On the contrary, the user will know that it does not need to take any additional action with respect to that action/order.

Prior to receiving the confirmation page, the network may request that the user login so that the network may identify the customer. If the user is a new customer, the site may request that the user register for the site. As a result, the site may retrieve and/or extract transaction data (e.g. transaction data 204) associated with the user and that particular action/order. As stated previously, the transaction data may include a customer ID (e.g., customer ID 214 and/or 304), an item ID (e.g., item ID 216 and/or 306), a device ID (e.g., device ID 218 and/or 308), and/or one or more payment instruments (e.g., payment instrument(s) 220 and/or 310). In various embodiments, the network or site, or software associated with the site, may use the transaction data to both process and fulfill the action/order.

Block 406 illustrates receiving a fulfillment communication. As stated above, the network may utilize the transaction data to process and fulfill the order. For example, once the order has been processed, the site may ship a physical item to the user or may download digital content to a device registered with the user. At or about the same time, the site may charge the user for the item that has been purchased and/or downloaded. Therefore, the user may receive some type of communication (e.g., telephone call, text message, e-mail, letter, etc.) indicating that the order has been fulfilled.

FIG. 5 is a flow diagram illustrating an example method of fulfilling an action received via a network. In various embodiments, the operations illustrated in FIG. 5 may be performed by a network, a website, and/or a server, such as server 108. More particularly, block 502 illustrates receiving an indication of an action via a network. In various embodiments, the indication of an action may constitute some user actuation indicating that the user desires to order an item (e.g., order 202). For instance, the order may identify an item (e.g., television, eBook, MP3 music file, etc.) to be acquired (e.g., purchased, rented, etc.) by the user. Alternatively, the action may correspond to any other type of action indicating that the user desires to perform some operation via the network.

Block 504 illustrates identifying an error associated with the network. For example, the network or a site accessible via the network may experience an error either when the user submits the order and/or when the network attempts to process the order. As a result, the network may be unable to process the order when it is received. Typically, if such an error occurs, the user would be presented with an error page (e.g., a "we are sorry" page) informing the user that an error prevented the network from processing the order. As a result, with respect to a website, the user would be required to navigate back to the previous webpage, possibly re-enter information associated with the item being acquired, and resubmit the order. Considering that the user would now need to perform additional actions to submit the order, this error may lead to a poor customer experience. Furthermore, depending on the degree of discontent experienced by the user, the user may also decide to acquire the item elsewhere, potentially resulting in a lost sale for the entity that received the order. Accordingly, the systems and techniques described herein allow for the order to be processed without presenting an error page and without needing the user to resubmit the order.

Block 506 illustrates retrieving transaction data associated with the action. In some embodiments, provided that an error associated with the network is identified, a site accessible via the network may collect information relating to an order and/or a user that submitted the order. For instance, and as stated above, the network may retrieve information (e.g., transaction data 204) relating to a customer that submitted the order (e.g., customer ID 214), an item to be acquired (e.g., item ID 216), a device in which the item is to be downloaded (e.g., device ID 218), and/or a method of payment (e.g., payment instrument(s) 220). Moreover, the transaction data may be used and/or processed such that the order is subsequently fulfilled. In other embodiments, the order may not be processed and/or fulfilled until the transaction data described above is retrieved via the network. That is, assuming that a network error has occurred, the network may be unable to fulfill the order until the transaction data is identified.

Block 508 illustrates storing the transaction data in a queue. In various embodiments, once the transaction data is identified, it may be stored in a queue, such as fail-safe queue 206 and/or 300. The queue may be stored by a server (e.g., server 108) and may include transaction data corresponding to one or more additional orders received via the network. Furthermore, the one or more additional orders may correspond to a single user or multiple users. In various embodiments, the transaction data may remain in the queue such that each order stored therein can be processed and fulfilled at a later time.

Block 510 illustrates optimistically fulfilling the action. More particularly, once the transaction data has been received, the network or a site accessible via the network may optimistically fulfill the order without first processing the order and without first receiving payment for the order. That is, the item may be provided to the user prior to the order being processed by the network. In some embodiments, the network or site may fulfill the order if the order meets or exceeds a confidence threshold. The confidence threshold may be based at least in part on the user that submitted the order, a value of the order, and/or the user's prior history with the site (e.g., prior purchases, etc.). However, the confidence threshold may be based on any factor that indicates that the user can be trusted to submit payment for the item after the order has been fulfilled. For instance, the network or site is more likely to optimistically fulfill an order from a user that has an extensive buying history from the site, as opposed to a new customer.

Block 512 illustrates processing the transaction data. In various embodiments, the transaction data may be processed by the offline module 212, as shown in FIG. 2. As mentioned previously, an error experienced by the network or the website may prevent the network from processing and/or fulfilling an order when that particular order is received. In an attempt to fulfill that order, the network retrieves transaction data to be stored in the queue. Therefore, although the order cannot be processed and fulfilled when the order is received, the offline module may be able to process the transaction data at a later time such that the order is processed and fulfilled. As a result, the user who submitted the order need only submit the order once and know that the order will be subsequently fulfilled.

Furthermore, in some embodiments, the transaction data may be automatically processed by the offline module once the transaction data is stored in the queue. Consequently, the orders may be processes and fulfilled in an expedient manner. However, when the offline module is unable to process the transaction data automatically, the transaction data may instead be processed manually. That is, the transaction data may be entered into the system by an individual associated with the entity that received the order.

Block 514 illustrates securing payment corresponding to the action. Regardless of whether the transaction data is processed automatically or manually, once the transaction data is processed, the user who submitted the order may be charged for the item that has already been optimistically fulfilled.

Block 516 illustrates presenting a confirmation page. More particularly, if the network does not optimistically fulfill the order, the network or a site accessible via the network may display a confirmation page to the user that submitted the order, indicating that the order has been received. Moreover, the confirmation page may also inform the user that the order will be fulfilled at a later time and/or that the user will be notified when the order is fulfilled. In some embodiments, the site may make a determination of whether the user and/or the order submitted by the user satisfies or exceeds the confidence threshold, as described above. If so, the order may be optimistically fulfilled. However, if the confidence threshold is not satisfied, the user may instead be presented the confirmation page. That is, the site may not sufficiently trust that the user will provide payment for the item if the order is fulfilled prior to the order being processed.

Block 518 illustrates processing the transaction data. In various embodiments, provided that the site displays to the user the confirmation page, the offline module may then process the transaction data prior to fulfilling the order. As stated above, the transaction data may be processed automatically or manually.

Block 520 illustrates fulfilling the action. In particular once the transaction data has been processed, the action may be fulfilled. That is, assuming that the action is acquiring an item from the website, the item included in the order may be provided to the user. In various embodiments, a physical item may be shipped to a user or digital content could be available for download or downloaded to a computing device and/or a mobile device owned by and/or registered to the user. At about the same time, the user may be charged for the item. In addition, the user may receive some type of communication (e.g., e-mail, telephone call, text message, etc.) indicating that their order has been fulfilled.

Utilizing the foregoing systems and/or techniques, a user may submit an action via a network and know that the action will be fulfilled. Moreover, although an error experienced by the network, or a website accessible via the network, may delay processing and/or fulfillment of the action, the action may nonetheless be processed and fulfilled without the user needing to resubmit the action. As a result, the user may receive an enhanced user experience.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. One or more non-transitory computer-readable media storing computer-executable instructions that, when executed by one or more processors, cause the one or more processors to perform operations comprising:
 receiving an indication that a user desires to perform an action associated with a network via at least one of a server hosting a website or a mobile application residing on a computing device associated with the user;

upon receiving the indication and upon identifying an error with network software utilized by the network, presenting to the user a confirmation page;

extracting transaction data, related to the action, from an order identifying an item to be purchased by the user;

processing the transaction data associated with the action by using an offline process; and fulfilling the action in response to determining that the transaction data has been processed.

2. The one or more non-transitory computer-readable media as recited in claim 1, wherein the operations further comprise storing the transaction data in a queue, the queue including one or more additional actions corresponding to the user or one or more additional users.

3. The one or more non-transitory computer-readable media as recited in claim 1, wherein the action comprises acquiring an item via the network.

4. The one or more non-transitory computer-readable media as recited in claim 1, wherein:

without identifying the transaction data, the error would prevent the network from fulfilling the action; and the confirmation page confirms to the user that the action has been received and that the action will be fulfilled at a later time.

5. The one or more non-transitory computer-readable media as recited in claim 1, wherein the operations further comprise:

processing the transaction data automatically utilizing the offline process; or processing the transaction data manually in response to determining that the offline process is unable to automatically process the transaction data.

6. The one or more non-transitory computer-readable media as recited in claim 1, wherein the transaction data is manually processed by validating the transaction data and placing the order associated with the action.

7. The one or more non-transitory computer-readable media as recited in claim 1, wherein the confirmation page presented to the user further displays that the user will be notified when the action is fulfilled.

8. The one or more non-transitory computer-readable media as recited in claim 1, wherein fulfilling the action in response to determining that the transaction data has been processed occurs prior to receiving payment for the action from the user.

9. A method comprising:

submitting, by a computing device associated with a user, an action associated with a network via at least one of a server hosting a website or a mobile application residing on the computing device, the action being associated with an order identifying an item to be purchased by the user, and the order being associated with transaction data;

receiving, by the computing device and based at least in part on an error with network software utilized by the network, a confirmation page indicating that the action has been received but will be fully processed at a later time;

receiving, by the computing device and based at least in part on a confidence threshold associated with the action, a first communication confirming that the action has been fulfilled; and receiving, by the computing device, a second communication indicating that the transaction data to secure payment for the action has been processed using an offline process.

10. The method as recited in claim 9, further comprising providing, to the network, information about the user, the information being used to process and fulfill the action.

11. The method as recited in claim 9, wherein the action comprises submitting the order to purchase the item from the website, and the method further comprises processing the transaction data to fulfill the order.

12. The method as recited in claim 9, wherein the transaction data includes at least one of:

a customer identifier identifying a user that submitted the order;

an item identifier identifying the item;

a device identifier identifying a device to which the item is downloaded; or a payment instrument identifying a method of payment to be used to purchase the item.

13. The method as recited in claim 9, wherein the second communication is received subsequent in time to the first communication.

14. A system comprising:

one or more processors;

memory;

a queue, stored in the memory, and configured to maintain transaction data in response to determining that an error with network software utilized by a network prevents the system from processing an order to purchase an item; and one or more computer-executable instructions stored in the memory and executable by the one or more processors to perform operations comprising:

receiving, from a computing device associated with a user, an indication that the user desires to perform an action associated with the network via at least one of a server hosting a website or a mobile application residing on the computing device, the action further being associated with a placement of the order;

identifying an error with network software utilized by the network;

presenting, to the computing device, a confirmation page in response to receiving the indication and determining the error;

processing the transaction data associated with the action by using an offline process; and fulfilling the action in response to determining that the transaction data has been processed.

15. The system as recited in claim 14, wherein the confirmation page confirms that the order has been received and that the action will be fulfilled at a later time.

16. The system as recited in claim 14, wherein the confirmation page further displays that the user will be notified when the action is fulfilled.

17. The system as recited in claim 14, wherein the queue includes one or more additional actions corresponding to the user or one or more additional users.

18. The system as recited in claim 14, wherein the system fulfills the order prior to receiving payment from the user.

19. The system as recited in claim 14, wherein presenting to the user the confirmation page comprises:

sending a first communication confirming that the action has been fulfilled; and sending a second communication indicating that the transaction data to secure payment for the action has been processed.

20. The system as recited in claim 14, wherein the transaction data includes at least one of:

a customer identifier identifying the user;

an item identifier identifying the item;

a device identifier identifying a device to which the item is downloaded; or a payment instrument identifying a method of payment to be used to purchase the item.

* * * * *